United States Patent [19]

Gamell

[11] 4,232,991
[45] Nov. 11, 1980

[54] ROTARY MOTOR

[75] Inventor: Joseph A. Gamell, Kalamazoo, Mich.

[73] Assignee: Joseph Gamell Industries, Inc., Kalamazoo, Mich.

[21] Appl. No.: 910,732

[22] Filed: May 30, 1978

[51] Int. Cl.³ .............................................. F03B 5/00
[52] U.S. Cl. .................................. 415/90; 415/172 R; 415/202
[58] Field of Search ............... 415/202, 90, 92, 170 R, 415/172 R

[56] References Cited

U.S. PATENT DOCUMENTS

| | | | |
|---|---|---|---|
| 807,452 | 12/1905 | Franke | 415/202 |
| 1,047,898 | 12/1912 | Scott | 415/90 |
| 1,259,318 | 3/1918 | Thompson | 415/172 |
| 2,045,851 | 6/1936 | Hamilton | 415/172 |
| 2,325,530 | 7/1943 | Meredith | 415/90 X |
| 3,690,784 | 9/1972 | Farrow | 415/202 X |
| 3,870,282 | 3/1975 | Wadensten | 366/124 |
| 3,932,057 | 1/1976 | Wadensten | 415/119 X |
| 3,938,905 | 2/1976 | Wadensten | 415/119 |
| 3,967,914 | 7/1976 | Gamell | 415/90 |

Primary Examiner—Leonard E. Smith
Attorney, Agent, or Firm—Gordon W. Hueschen

[57] ABSTRACT

A rotary motor which is propelled by a jet of high-pressure fluid comprising an annular rotor having a diameter much greater than its thickness and its width and a roughened annular surface, a housing having a smooth annular surface apposed to the roughened annular surface of the rotor, bearing means comprising apposed annular races separated by rolling means and united in freely rotating, inseparable relation one to the other and to the rolling means. The races have an inside diameter at least equal to the inside diameter of the annular rotor and one race is affixed to the housing and the other race is affixed to the rotor. A plurality of jet orifices for directing a jet of high-pressure fluid into the space between the apposed surfaces of the rotor and the housing are oriented so that at least a portion of the jet impinges on the roughened surface of the rotor at an acute angle. The apposed surfaces can be planar annuli or cylindrical annuli.

6 Claims, 18 Drawing Figures

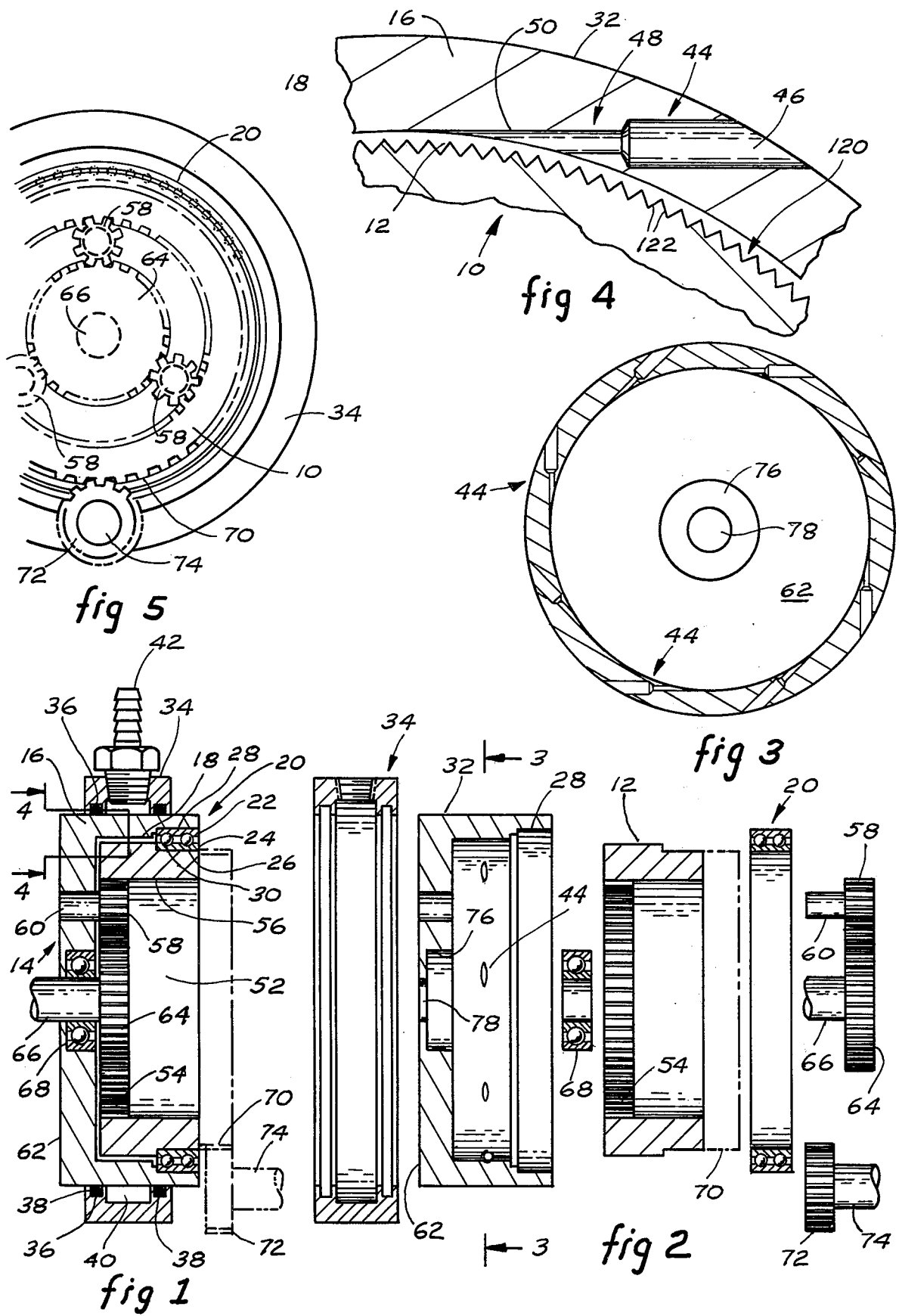

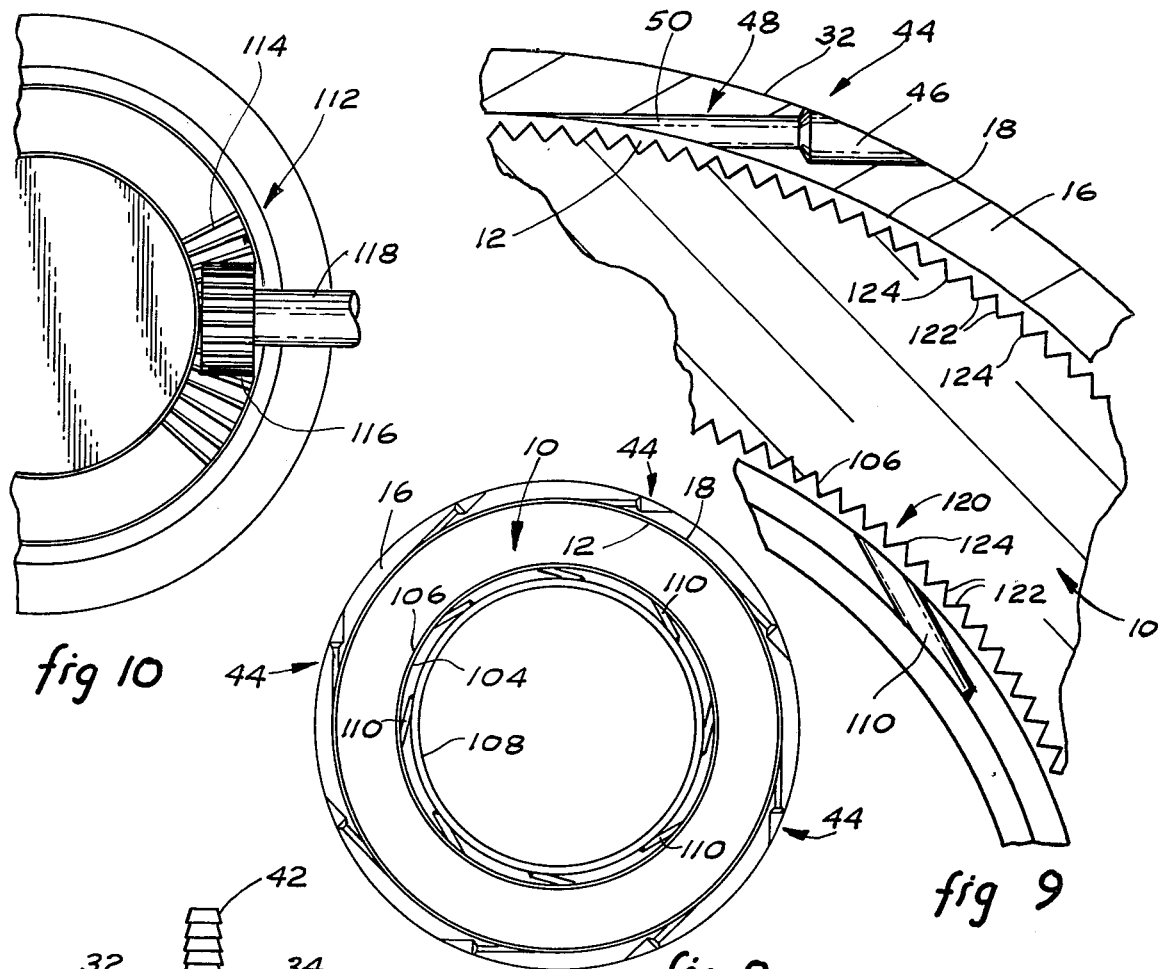
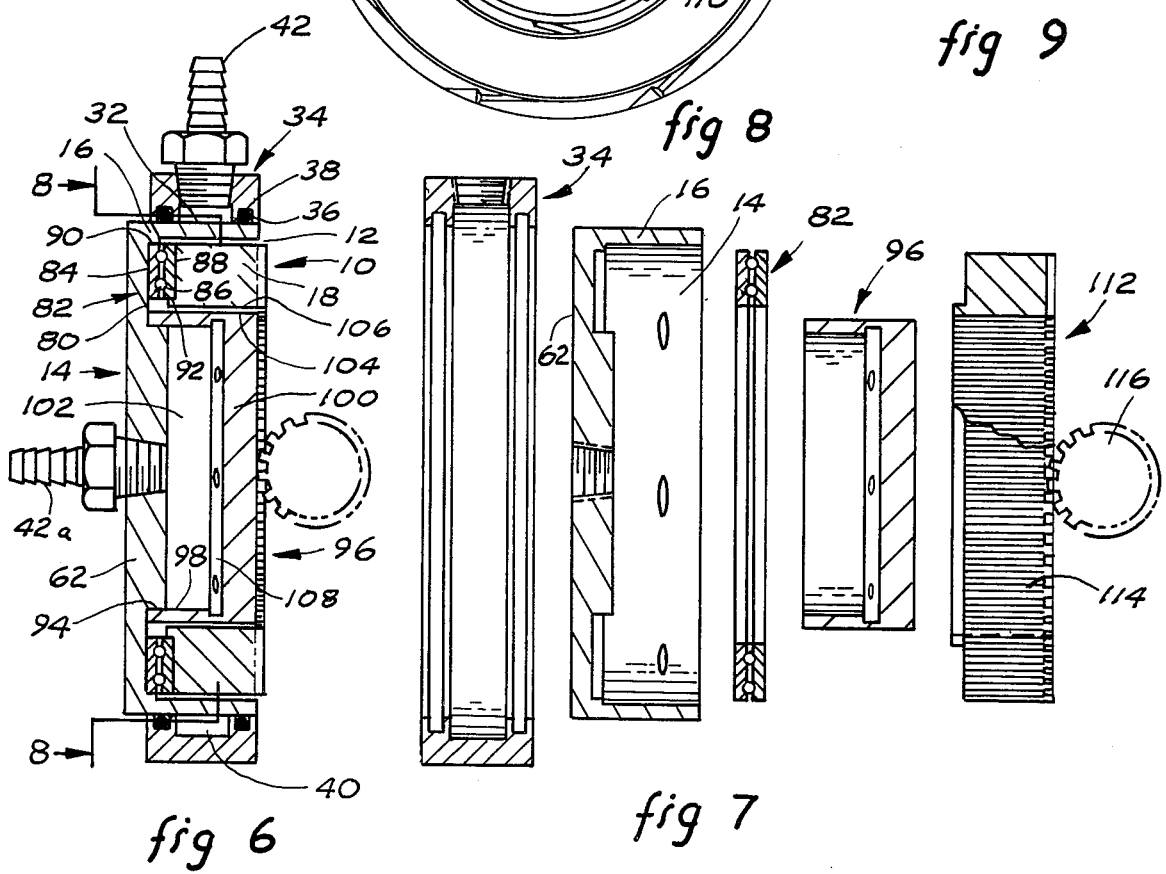

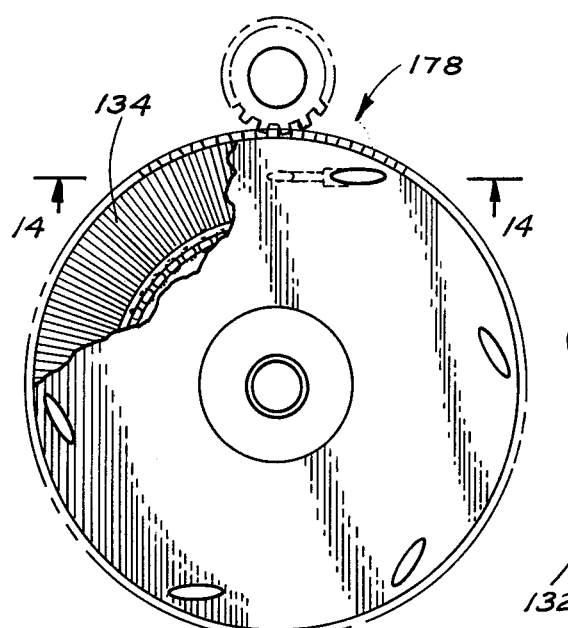
fig 13
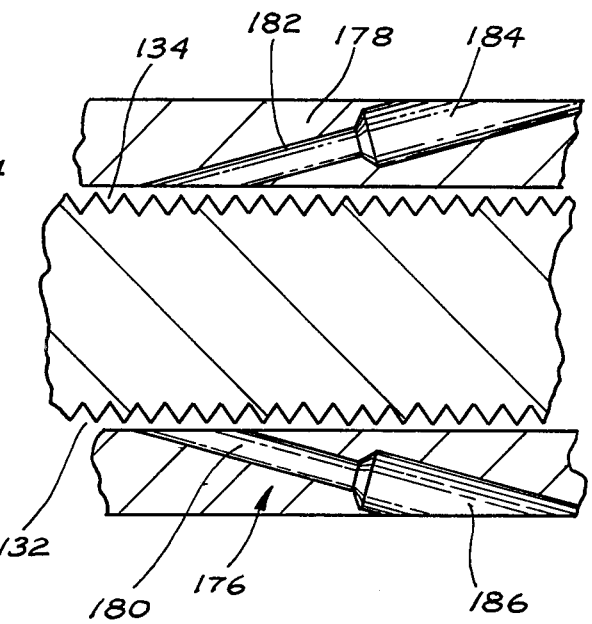
fig 14
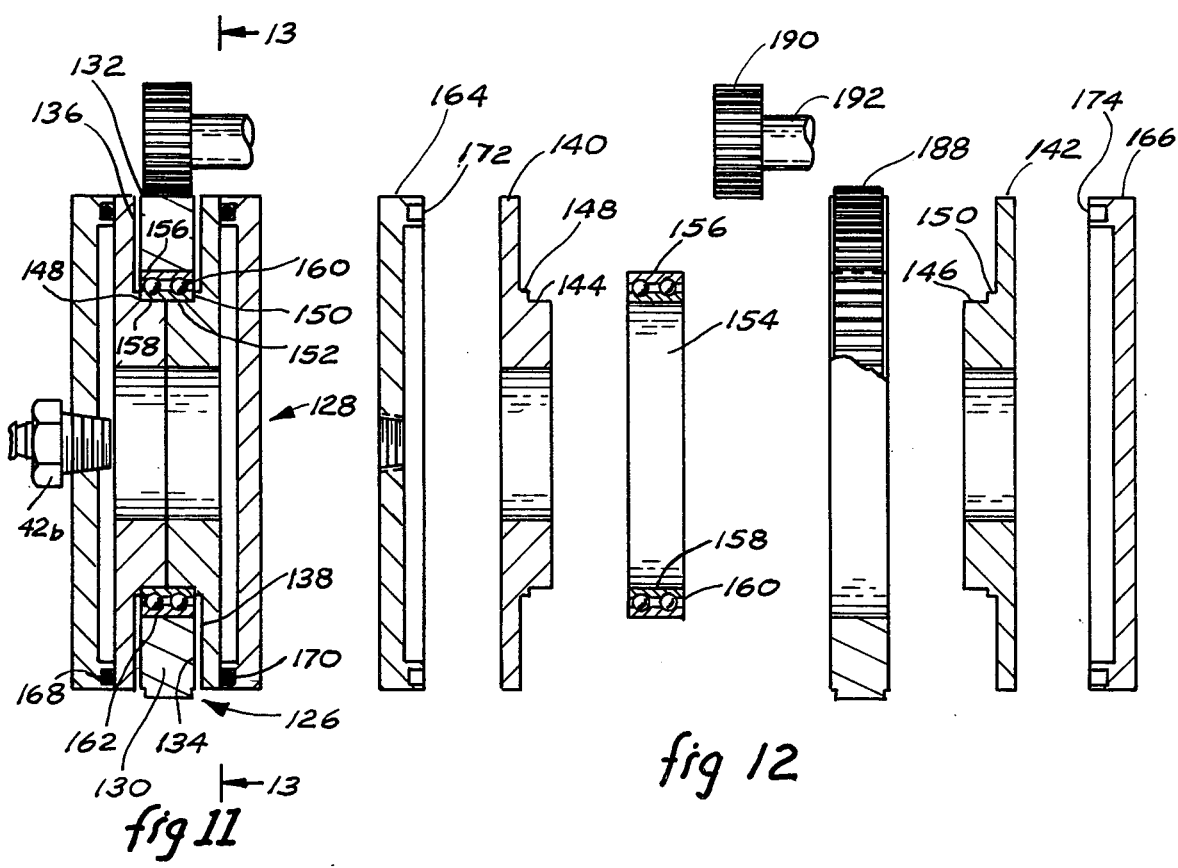
fig 11
fig 12

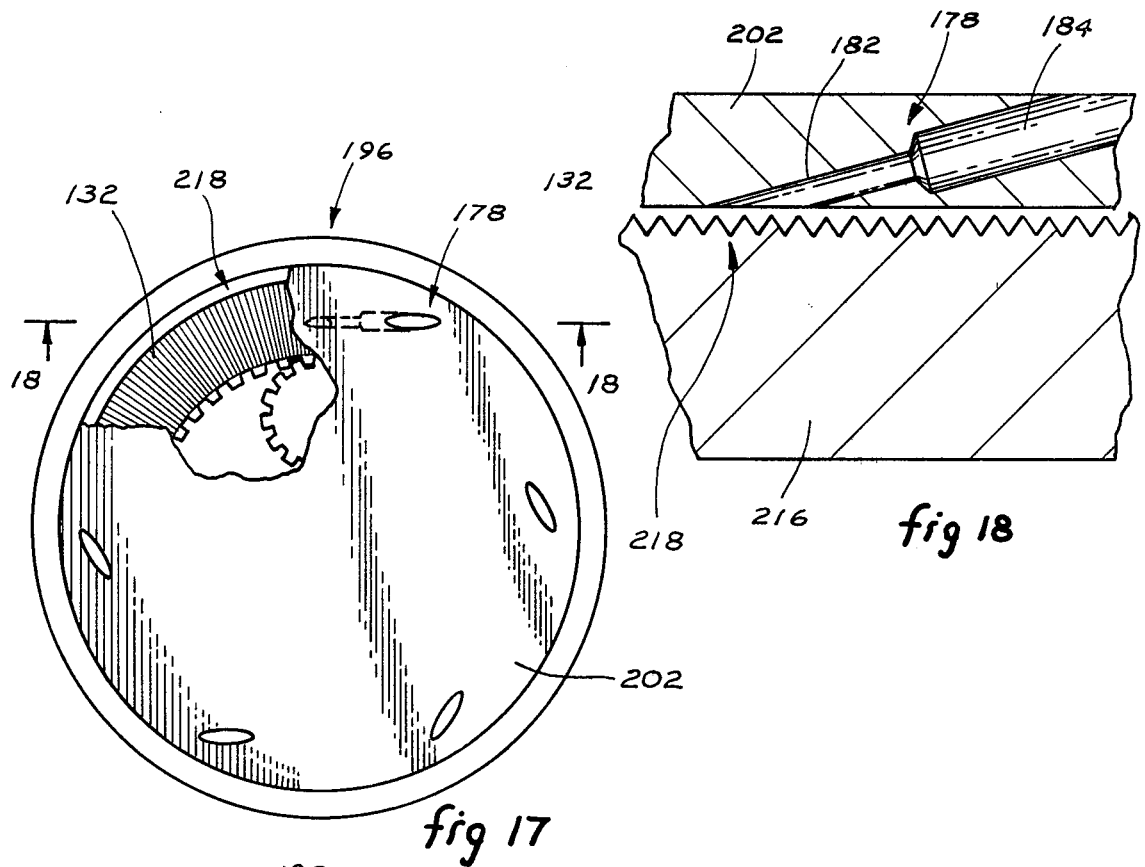
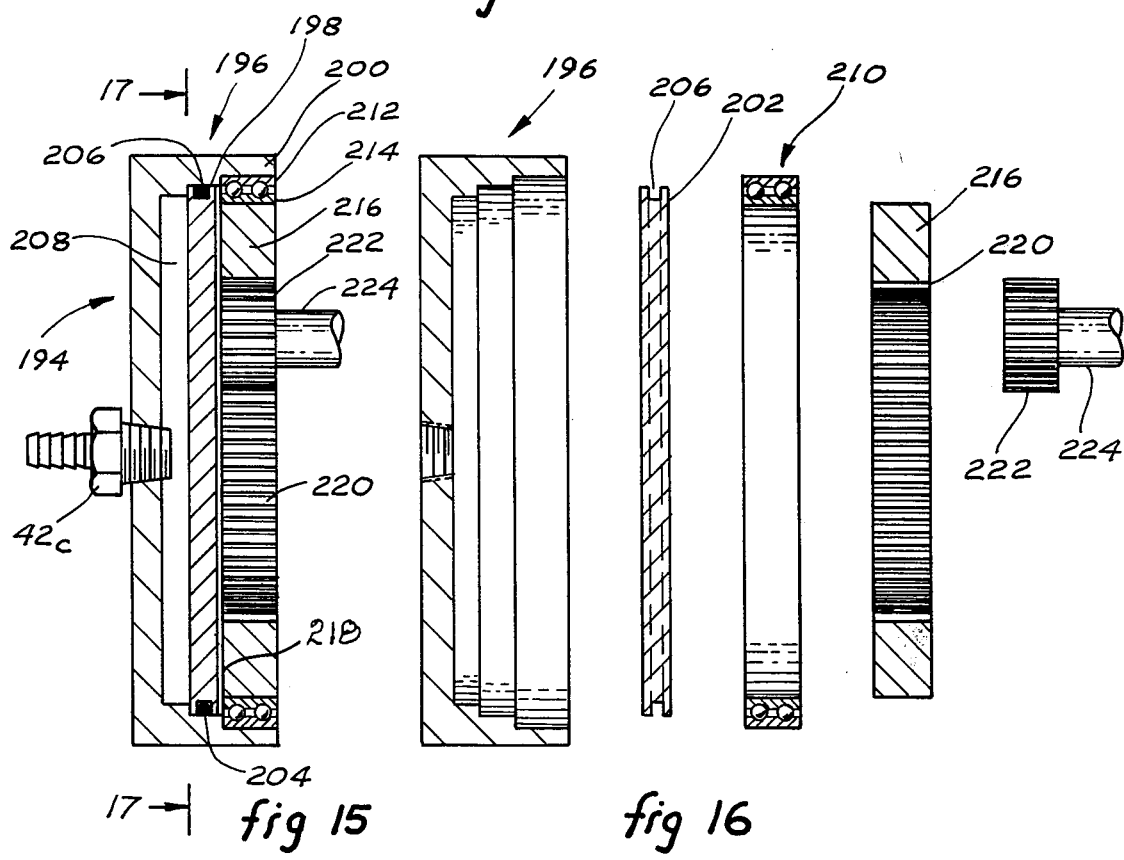

ROTARY MOTOR

BACKGROUND OF THE INVENTION

1. Field of Invention

The invention relates to a rotary motor which is propelled by a jet of high-pressure fluid which may be a compressible fluid, such as air or steam, or a hydraulic fluid, such as water.

2. PRIOR ART

In my copending application Ser. No. 869,143, filed Jan. 13, 1978, there is disclosed a pressure fluid turbine having a housing cylindrical inner surface which is smooth and a cylindrical motor having a roughened cylindrical surface apposed to the smooth cylindrical surface of the housing. A jet of high-pressure fluid is directed into the space between the apposed surfaces in such manner that a portion of it enters tangentially to the smooth inner surface of the housing and another portion impinges on the roughened outer surface of the rotor.

The roughening of the rotor can be effected by knurling to provide transverse channels which are regularly-shaped channels or saw-toothed-shaped channels or, can be machined or otherwise formed to have rectangularly-shaped transverse channels. In any case, the channels may go straight across, axially of the rotor, or they may be curved with the arc of the curvature away from the jet, or they can be shaped in a herringbone pattern with the apexes away from the jet. The spacing between the two apposed surfaces is very close, being between about 0.005 to about 0.015 of an inch, advantageously, between about 0.009 and about 0.012 inches.

Inasmuch as this invention, at least in part, is an improvement in the invention in the aforesaid application and the disclosure of that application is incorporated herein by reference.

OBJECTS OF THE INVENTION

It is an object of the invention to provide a new and improved pressure-fluid turbine or rotary motor. It is a further object of the invention to provide such a motor which has improved efficiency. It is a further object of the invention to provide such a motor which is simple of construction and economical of manufacture. It is a further object of the invention to provide such a motor in which the rotor has a high moment of inertia per unit weight. It is a further object of the invention to provide such a motor in which the rotor is mounted for rotation relative to the housing by means of an annular bearing assembly. Further objects of the invention are to avoid the disadvantages of the prior art and to obtain such advantages as will appear as the description proceeds.

SUMMARY OF THE INVENTION

The invention relates to a rotary motor which is propelled by a jet of high-pressure fluid comprising an annular rotor having a diameter much greater than its thickness and its width and a roughened annular surface, a housing having a smooth annular surface apposed to the roughened annular surface of the rotor, bearing means comprising apposed annular races separated by rolling means and united in freely rotating, inseparable relation one to the other and to said rolling means, said bearing means having an inside diameter at least equal to the inside diameter of the annular rotor and having one race affixed to the housing and the other race affixed to the rotor, and jet means for directing a jet of high-pressure fluid into the space between the apposed surfaces of the rotor and the housing so oriented that at least a portion of the jet impinges on the roughened surface of the rotor and at an acute angle thereto.

The apposed surfaces of the rotor and the housing may be either planar annuli or cylindrical annuli. Advantageously, in the latter case, the annular rotor is inside the annular housing and the outer surface of the rotor is roughened and the inner surface of the housing is smooth and apposed to the outer roughened surface of the rotor. Also, advantageously, in such case, the jet means is so oriented that a portion of the jet is directed tangentially into the space between the apposed surfaces, whereby a part of the jet goes directly into the space between the apposed surfaces and the other part impinges on the rotor and is dragged into the space between the apposed surfaces by the rotation of the rotor. In this way, energy is imparted to the rotor by a reaction effect due to the portion of the jet which impinges on the rotor and due to the drag effect obtained by the high-pressure fluid circulating in the space between the apposed surfaces.

The bearing races of the bearing means may be either planar annuli or cylindrical annuli.

Advantageously, the inside diameter of the inside rotor is at least four (4) times the thickness thereof and the inside diameter of the bearing means is at least equal to the inside diameter of the annular rotor.

Also, advantageously, the spacing between the apposed surfaces of the rotor and the housing is between about 0.005 to about 0.015 of an inch, preferably between about 0.009 and 0.012 of an inch.

Advantageously, the roughened surface comprises channels which are tranverse to the jet. When the jet is discharged from a nozzle, it tends to fan out, and more particularly, if the pressure fluid is an expanding type, such as compressed air. Hence, the jet may be likened unto a "Y" with the stem of the Y in the bore of the nozzle and the arms of the Y representing the fanning-out portion of the jet. The transverse channels in the outer roughened surface of the rotor are disposed in a way to be substantially symmetrical to the jet, so that each portion of the channel which is to the side of the mid-plane has essentially the same angular relation to the expanding portion of the jet as any other. Also, to obtain an effective drag effect, the channels should be oriented so that they intercept the expanding elements of the jet. Thus, if the channels are transverse, the mid-portion will intercept the mid-portion of the jet and the side portions will intercept the expanding elements or portions of the jet.

By making the channels slope inwardly toward the mid-plane in a herringbone pattern, the side portions will be approximately normal to the expanding portions of the jet. If the herringbone pattern were reversed, the side portions of the channels would line up with the expanding portions of the jet, and the drag effect would be lost. Also, a substantial proportion of the drag effect is lost when criss-cross knurling is used, since then there are open channels in alignment with the expanding elements or portions of the jet and only the pyramidal peaks are engaged by the jet.

If desired, the transverse channels can be curvilinear, instead of the rectilinear form of the herringbone pattern. In other words, the points of the herringbone pattern can be rounded off and the same effect will be obtained.

Advantageously, the channels are disposed about the roughened surface of the rotor to provide between about 15 and about 30 channels per inch, and preferably are at least 0.015 of an inch deep. Any greater depth that is practical can be used. Also, advantageously, the sides of the channels slope up to knife edges so that any transverse cross-section of the channels has a toothed, preferably serrated, appearance. Advantageously, the serrated surface is saw-tooth with the edge thereof having the greater slope being oriented toward the jets, thus making that surface nearly normal to the portion of the jet which impinges thereon and nearly normal to the portion of the jet which effects drag on the channels.

BRIEF DESCRIPTION OF THE DRAWINGS

In the drawings:

FIG. 1 is a cross-section of a rotary motor according to the invention taken through the axis thereof.

FIG. 2 is an exploded view of FIG. 1.

FIG. 3 is a cross-section view taken along line 3—3 of FIG. 2.

FIG. 4 is a fragmentary section taken along line 4—4 of FIG. 1.

FIG. 5 is a face view looking from the right of FIG. 1.

FIG. 6 is a cross-section taken through the axis of a modified form of the invention.

FIG. 7 is an exploded view of FIG. 6.

FIG. 8 is a cross-section taken along line 8—8 of FIG. 6.

FIG. 9 is a detailed view of FIG. 8.

FIG. 10 is a face view looking from the right of FIG. 6.

FIG. 11 is a cross-section taken through the axis of another form of the invention.

FIG. 12 is an exploded view of FIG. 11.

FIG. 13 is a cross-section taken along line 13—13 of FIG. 11 with parts broken away.

FIG. 14 is a partial cross-section taken along line 14—14 of FIG. 11.

FIG. 15 is a cross-section taken through the axis of a modified form of the invention.

FIG. 16 is an expanded view of FIG. 15.

FIG. 17 is a cross-section taken along line 17—17 of FIG. 15, with parts broken away.

FIG. 18 is a partial section taken along line 18—18 of FIG. 17.

DETAILED DESCRIPTION OF THE INVENTION

Referring now particularly to FIGS. 1 through 5, there is shown a form of the invention in which 10 is an annular rotor having a roughened cylindrical surface 12 on the outer portion thereof. The housing member 14 has an annular portion 16 having a smooth inner cylindrical surface 18 apposed to the roughened cylindrical surface 12 of the rotor 10.

The rotor 10 is mounted for roatation in the housing 14 by means of a bearing assembly 20 having an outer cylindrical race 22 and an inner cylindrical race 24 separated by rolling means 26 which may be either ball bearings or roller bearings. The housing and the rotor are chamfered at 28 and 30 to receive the bearing assembly 20 in a tight friction fit, whereby the rotor is affixed to the race 30 and the housing is affixed to the race 28 and the rotor is mounted for rotation relative to the housing 14 with close tolerances being maintained between the apposed cylindrical surfaces of the housing and the rotor which, as pointed out above, should be between about 0.005 and about 0.015 of an inch, preferably between about 0.009 and about 0.012 of an inch. This construction has the further advantage that the bulk of the rotor is concentrated at or near the periphery of the rotor, so that the rotor has a high moment of inertia per unit mass.

The annular portion 16 of the housing 14 has a smooth cylindrical outer surface 32. Surrounding this is an annular channel member 34 sealed to the cylindrical outer surface 32 by o rings 36 seated in the annular channels 38 in the sides of the annular channel member 34. The annular channel member 34 thus provides a manifold 40 completely surrounding the annular portion 16 of the housing 14. An inlet means 42 is provided for admitting high-pressure fluid to the manifold 40.

The annular portion 16 of the housing has a plurality of jet bores 44 having an enlarged exterior portion 46 and a relatively small inner portion 48. The jet bores 44 are cylindrical and are oriented so that the outermost element 50 is tangential to the inner surface 18 of the annular portion 16 of the housing 14. The diameter of the jet bores 44 is greater than the spacing between the rotor 10 and the inner surface 18 of the annular portion of 16 of the housing. This orientation of the jet-forming portion of the jet bores 44 causes a portion of the jet to be introduced tangentially into the space between the rotor 10 and the smooth inner surface 18 and the balance to impinge on the rotor 10 and to be drawn into the space between the rotor 10 and the inner surface 18 by the rotation of the rotor 10. This results in the jet, which initially has a diameter larger than the spacing between the housing and the rotor to be flattened to a thickness corresponding to the spacing between the housing and the rotor and to flare out over the smooth inner surface of the housing in a free unchanneled fan-shaped jet that imparts energy to the rotor by the drag thereof on the roughened surface of the rotor and to vent through the space between the housing and the rotor on the left, and through the bearing races on the right. Advantageously, the diameter of the jet portion 48 is such that between about 10 and about 50 percent of the jet is introduced tangentially and the balance, about 50 to about 90 percent, is caused to impinged on the roughened surface of the rotor.

The power take-off can comprise a set of planetary gears 52 conmprising a ring gear 54 swaged to the inner surface 56 or machined therein, satellite gears 58 journaled on trunnions 60 projecting inwardly from the side wall 62 of the housing 14 and sun gear 64 mounted on axle 66 which is journaled in the bearing 68 centered in the side wall 62 of the housing 14. Alternatively, the power take-off can comprise a ring gear 70 swaged to or machined in an outer surface portion of the rotor 10 adapted to mesh with the spur gear 72 mounted on axle 74. The bearing 68 is inset in the central aperture 76 in the side wall 62 and the shaft 66 projects through the central aperture 78.

In FIGS. 6 through 10, there is illustrated another form of the invention in which like parts are referred to by the same reference numerals, for example, 10 is an annular rotor having a cylindrical roughened outer surface 12, 14 is a housing having a smooth annular inner surface 18 and a smooth cylindrical outer surface 32, and 34 is an annular channel member forming the manifold 40, along with other details described by the same reference numerals with regard to FIGS. 1 through 5.

In the modification shown in FIGS. 6 through 10, the rotor 10 is mounted on the inner side wall 80 of the side wall 62 of the housing 14 by means of the bearing means 82. The bearing means comprises an outer planar annular race 84, an inner planar annular race 86, and the rolling means 88. The bearing means 82 is assembled in a unitary assembly such that the two races are adapted to rotate relative to the other, but cannot be separated from one another or the rolling means. The outer race 84 is affixed to the inner side wall 80 by suitable means such as spot welding or by swagging in underneath the cylinder 90. Similarly, the inner bearing 86 is affixed to the rotor 10 by suitable means such as spot welding or by swaging over the cylinder 92. The rotor 10 is thus mounted to rotate freely with its roughened outer surface 12 apposed to the smooth inner surface 18 of the annular portion 16 of the housing 14.

The sidewall 62 of the housing 14 is provided with a cylindrical shoulder 94 to which is affixed the hollow cylinder 96 comprising annular portion 98 adapted to fit the shoulder 94 in a tight friction fit and an outer face 100 forming with the annular portion a closed chamber for holding the manifold 102.

The annular portion 98 of the hollow cylinder 96 has a smooth outer surface 104 and the inner portion of the rotor 10 has a roughened cylindrical surface 106 apposed to the smooth outer cylindrical surface 104 of the hollow cylinder 96.

The annular portion 98 of the outer cylinder 96 has an annular channel 108 centrally located with reference to the roughened cylindrical inner surface 106 of the rotor 10. In the channel 108 is a plurality of jet orifices 110, as shown in FIG. 8, oriented to direct a jet of high-pressure fluid at an acute angle onto the roughened cylindrical surface 106 of the rotor 10. This angle should be as small as practicably possible, advantageously, not more than 15 degrees to the tangent at the point where the center line of the jet orifice intercepts the outer surface of the annular channel 108.

The power take-off comprises a planar annular ring gear 112 having radially oriented cogs 114 and a complementary pinion gear 116 affixed to shaft 118.

In the modification shown in FIGS. 1 through 5 and 6 through 10, the roughened surfaces on the rotor are formed by transverse "V" channels 120, the sides 122 of which meet together in a common line 124 with the sides of adjacent panels. Such transverse channels can be formed in the surfaces of the rotor by a knurling tool.

The transverse channels 120 can have other shapes, as described in my copending application Ser. No. 869,143, filed Jan. 13, 1978, and preferably have a depth of at least about 0.015 of an inch. In this way, the transverse channels present a surface which is essentially normal to the high-pressure jet so that maximum impact reaction is obtained. For this purpose, it is of advantage that the jet orifice have a diameter between four and five times the clearance between the rotor and the housing. Thus, if the clearance between the housing and the rotor is between about 0.009 and 0.012 of an inch, the diameter of the jet bores can be between about 0.035 and 0.06 of an inch.

In FIGS. 11 through 14, there is shown another modification of the invention. In this form of the invention, there is shown a rotor 126 and a housing 128. The rotor 126 comprises an annular member 130 having annular planar faces 132 and 134 having roughened surfaces.

The housing 128 has smooth planar annular faces 136 and 138 apposed, respectively, to the planar annular faces 132 and 134 of the rotor 126.

The housing 128 comprises two annular plate members 140 and 142 having annular hubs 144 and 146, respectively, and annular shoulders 148 and 150, respectively. The two hubs 144 and 146 are adapted to be affixed together, as shown in FIG. 11, by bolts or other means not shown, to form a seat 152 for the bearing means 154. The bearing means 154 comprises an outer cylindrical race 156 and an inner cylindrical race 158 separated by rolling means 160. The inner race 158 is centered by the shoulders 148 and 150 and the outer race is affixed to the inner surface 162 of the annular member 130 constituting the rotor 126. The latter is fitted on the race 156 by a tight friction fit or by swaging, as needed, to constitute the annular member 130 and the bearing means 154 as a unit whereby, by means of the shoulder 148 and 150, the annular member 130 is centered between the annular faces 136 and 138.

Affixed to the annular plates 140 and 142 are hollow cylindrical members 164 and 166 sealed to the annular members 140 and 142 by O rings 168 and 170 disposed in channels 170 and 174. The hollow cylindrical members 164 and 166 can be clamped against the annular plates 140 and 142 by any suitable means, such as transverse bolts, not shown.

The portions of the annular plate 140 and 142 apposed to the annular member 130 have jet means 176 and 178 adapted to direct a jet of high-pressure fluid onto the planar annular faces 132 and 134 of the annular member 130. These two faces have roughened surfaces, as shown in FIG. 14. The jet means 176 and 178 have jet orifices 180 and 182 and large portions 184 and 186 corresponding, respectively, in size and shape to the jet orifice 48 and enlarged portion 46 of FIGS. 4 and 9. The jet orifices 180 and 182 are oriented against the planar inner faces 132 and 134 at an acute angle, as small as practicably possible, so that the jets impinge upon the roughened surfaces 132 and 134 substantially normal to the channels of the roughened surface. In this case, as best seen in FIG. 13, the channels are radially disposed, instead of transversely disposed, as in the other modifications. They have the same shape, number, and depth, however, as the other modifications. In this modification, however, all of the high-pressure jet impinges on the roughened annular surfaces and all of the jet is drawn into the space between the apposed surfaces and flattened out because of the smaller space between the apposed surfaces.

The power take-off comprises a ring gear 188 swaged to, or machined in the outer surface of the annular member 130 and a complementary pinion gear 190 mounted on shaft 192.

FIGS. 15 through 18 show a further modification of the invention, which is similar to that of FIGS. 11 through 14. In this modification, there is provided a housing 194 having a cylindrical annular portion 196 provided with step shoulders 198 and 200. Fitted into the shoulder 198 is a cylindrical plate 202 sealed therein by O ring 204 disposed in channel 206, thereby forming a manifold 208 having high-pressure inlet means 42c. In the second shoulder 200, there is disposed a bearing means 210 composed of an outer race 212, which is forced into contact with the shoulder 200 in tight friction fit. Secured to the inner race 214 is an annular rotor 216 having a roughened planar annular face 218 apposed to a smooth annular portion of the plate 202, which has jet apertures 178 having a jet nozzle portion 182 and an enlarged portion 184, as described in connection with FIG. 14. The roughened planar annular face 218 of the rotor 216 has radial channels 132, as described in connection with FIG. 14.

The power take-off comprises a ring gear 220 swaged to, or machined on the inner surface of the rotor 216 and a complementary pinion gear 222 and shaft 224.

The housing and rotor can be made of any suitable material, for example, aluminum or aluminum alloys, magnesium alloys, or high-impact plastics, such as nylon, polycarbamate, or Teflon TM (polytetrafluoroethylene). Advantageously, the smooth surface of the housing which is apposed to the rotor, is made, or coated with Teflon TM in order to reduce the drag of the housing on the jet as it circulates between the housing and the rotating motor.

It is to be understood that the term 'smooth' as applied to the surface of the housing apposed to the roughened surface of the rotor means that it is free of obstruction to the flow of high-pressure fluid. Thus, the housing can have annular grooves or channels without there being any substantial obstruction of the flow of high-pressure fluid. Also, it can have grooves or channels which flare outwardly from the center or loci of the jet orifices, in the same direction that the jet tends to flare outwardly as it leaves the jet orifices.

It is to be understood, also, that where the discharge is from one side only of the rotor, as in FIG. 6, all of the jet will discharge from that side, just as if one leg of the Y described above had collapsed on the other; that the jet, in some modifications, as in FIG. 1, will discharge through the bearing means; that in FIG. 1, the spacing between the housing and the side of the rotor should be sufficient for jet exhaust; and that exhaust ports can be drilled in the housing on each side of the smooth annular surface which is apposed to the roughened annular surface, advantageously, so oriented that the jet is exhausted with a minimum of back pressure.

Thus, the fan-shaped jets are continuously vented through the space between the smooth annular surface and the roughened annular surface, which space is in direct communication all around the circumference of the rotor through communicating channels formed either by apposed surfaces of the rotor and the housing, or by the bearing races, or both. The jet stream is forced into these channels, both by the natural fanning-out effect, and by the crowding effect of the next following jet.

It is to be understood that the invention is not to be limited to the exact details of operation or structure shown and described, as obvious modifications and equivalents will be apparent to one skilled in the art.

I claim:

1. In a rotary motor, the rotor of which is propelled by a jet of high-pressure fluid propellant, the combination which comprises
    an annular rotor consisting of a ring having a diameter much greater than its thickness and its width, and a roughened annular surface;
    a housing having a smooth annular surface apposed to said roughened annular surface and uniformly spaced therefrom in all directions;
    bearing means for rotatably supporting said annular rotor consisting of apposed annular races separated by rolling means and united in freely rotating, inseparable relation one to the other and to said rolling means, said bearing means having an inside diameter at least equal to the inside diameter of said annular rotor and having one race affixed to said housing and the other race affixed to said rotor; and
    jet orifices arranged to direct a plurality of jets of high-pressure fluid propellant into the space between the apposed surfaces of said rotor and said housing at spaced intervals about the periphery thereof and so oriented that at least a portion thereof impinges on said roughened surface at an acute angle, said housing and said rotor having apposed spaced-apart surfaces forming a peripheral passageway communicating with the space between said first-named apposed surfaces and the ambient atmosphere, whereby said jets fan out from the point of impact on the rotor to said peripheral passageway before reaching the next jet.

2. The rotary motor of claim 1, in which the apposed surfaces of said rotor and said housing are parallel planar surfaces which are wider than said jet orifices.

3. The rotary motor of claim 2 in which the roughened surface comprises a plurality of side-by-side radial channels.

4. In a rotary motor, the rotor of which is propelled by a jet of high-pressure fluid propellant, the combination which comprises
    an annular rotor consisting of a ring having a diameter much greater than its thickness and its width, and a roughened right cylindrical outer surface;
    a housing having a smooth right cylindrical inner surface apposed to said roughened right cylindrical outer surface and concentric therewith, whereby the spacing between the apposed surfaces is uniform in all directions;
    bearing means for rotatably supporting said rotor consisting of apposed annular races separated by rolling means and united in freely rotating, inseparable relation one to the other and to said rolling means, said bearing means having an inside diameter at least equal to the inside diameter of said annular rotor and having one race affixed to said housing and the other race affixed to said rotor; and
    jet orifices arranged to direct a plurality of jets of high-pressure fluid propellant into the space between the apposed surfaces of said rotor and said housing at spaced intervals about the periphery thereof and so oriented that a portion only of the jet impinges on said roughened surface at an acute angle and the balance is introduced tangentially to the right cylindrical surface of the inner housing and does not impinge on the roughened surface of the rotor, said housing and said rotor having apposed spaced-apart surfaces forming peripheral passageways at each side of the rotor communicating with the space between said first-named apposed surfaces and the ambient atmosphere, whereby said jets fan out to each side of the jet from the point of introduction of the jets toward said peripheral passageways.

5. The rotary motor of claim 4, in which the inside diameter of the annular rotor is at least four (4) times the thickness thereof, and the spacing between the apposed surfaces of said rotor and said housing is between about 0.005 and about 0.015 of an inch.

6. The rotary motor of claim 4, in which the power takeoff comprises a ring gear affixed to the inner surface of said rotor which meshes with satellite gears which, in turn, mesh with an axially disposed sun gear.

* * * * *

UNITED STATES PATENT AND TRADEMARK OFFICE
CERTIFICATE OF CORRECTION

PATENT NO. : 4,232,991

DATED : November 11, 1980

INVENTOR(S) : Joseph A. Gamell

It is certified that error appears in the above-identified patent and that said Letters Patent are hereby corrected as shown below:

Col. 3, line 60; "roatation" should read -- rotation --
Col. 4, line 49; "conmprising" should read -- comprising --
Col. 4, lines 49 and 55; "swaged" should read -- swagged --
Col. 5, line 16; "swaging" should read -- swagging --
Col. 6, lines 16 & 17; "swaging" should read -- swagging --
Col. 6, line 51; "swaged" should read -- swagged --
Col. 7, line 6; "swaged" should read -- swagged --
Col. 7, line 17; "motor." should read -- rotor. --
Col. 8, line 65; "takeoff" should read -- take-off --

Signed and Sealed this

Third Day of March 1981

[SEAL]

Attest:

RENE D. TEGTMEYER

Attesting Officer

Acting Commissioner of Patents and Trademarks